United States Patent [19]
Kummerman

[11] 3,796,179
[45] Mar. 12, 1974

[54] SEALING DEVICE, IN PARTICULAR FOR A HATCH-COVER OR THE LIKE

[75] Inventor: Henri Kummerman, Geneve, Switzerland

[73] Assignee: MacGregor-Comarain, Ville D'Avray, France

[22] Filed: Jan. 3, 1972

[21] Appl. No.: 214,860

[30] Foreign Application Priority Data
Jan. 5, 1971   France .............................. 71.00073

[52] U.S. Cl........... 114/201 R, 114/201 A, 160/188
[51] Int. Cl............................................. B63b 19/12
[58] Field of Search............ 114/201 R, 201 A, 202; 49/477, 490, 489, 498; 160/188

[56] References Cited
UNITED STATES PATENTS
3,347,200   10/1967   Mege ................................. 114/202
3,171,381   3/1965   Meek .............................. 114/201 A
3,388,502   6/1968   Ceyer et al. ........................... 49/498

Primary Examiner—George E. A. Halvosa
Assistant Examiner—Edward R. Kazenske
Attorney, Agent, or Firm—Kenyon & Kenyon Reilly Carr & Chapin

[57] ABSTRACT

A sealing device for use between two separable bodies capable of being placed in pressed contact with one another along at least one joint line and at least one of which is removable with respect to the other, comprising a continuous flexible pipe secured along said joint line on one of said two bodies to co-operate over its whole length with a narrower elongated bearing element fast with the other body, wherein the improvement consists in that said pipe permanently contains a substantially constant amount of gaseous fluid.

9 Claims, 9 Drawing Figures

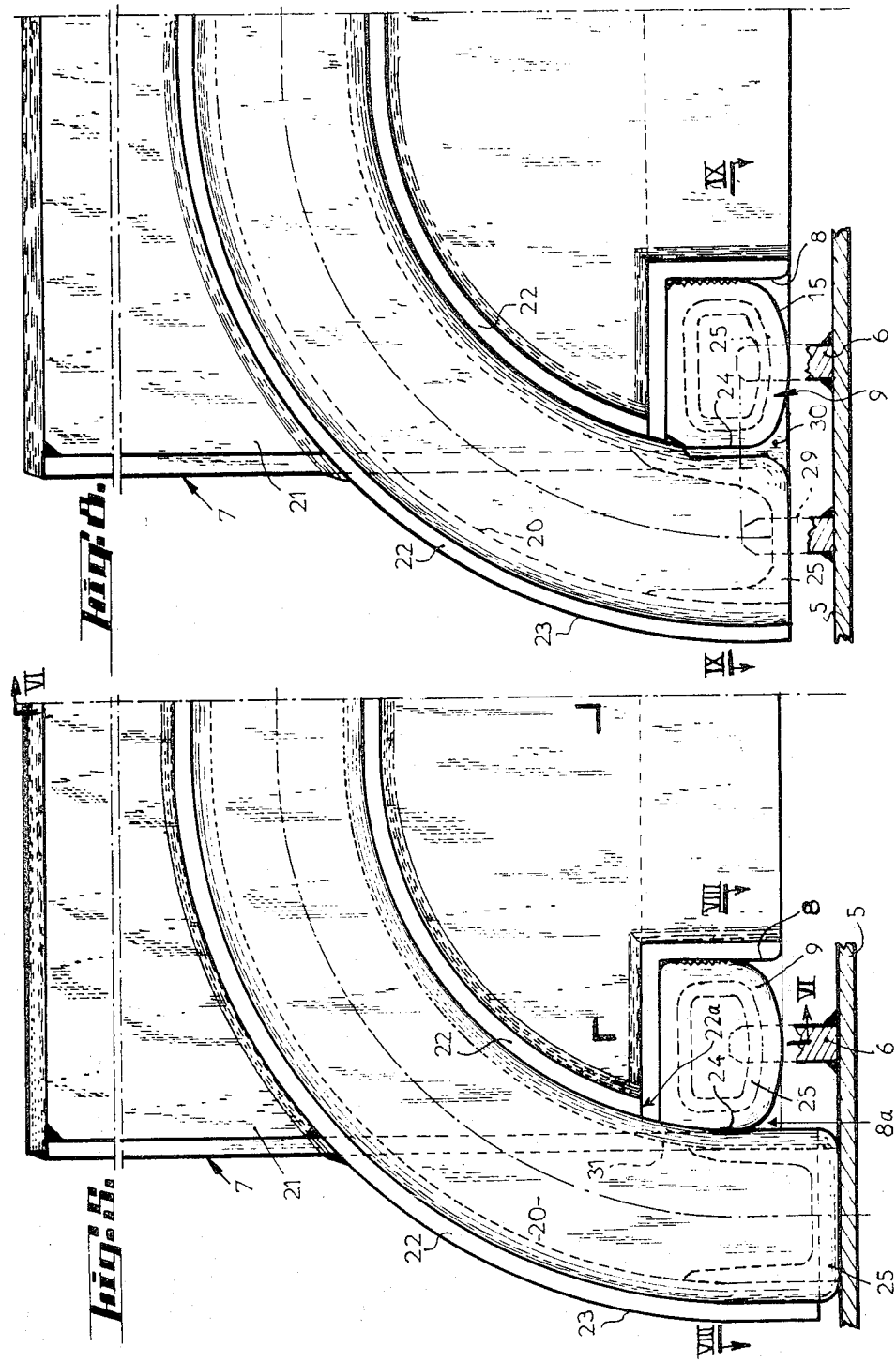

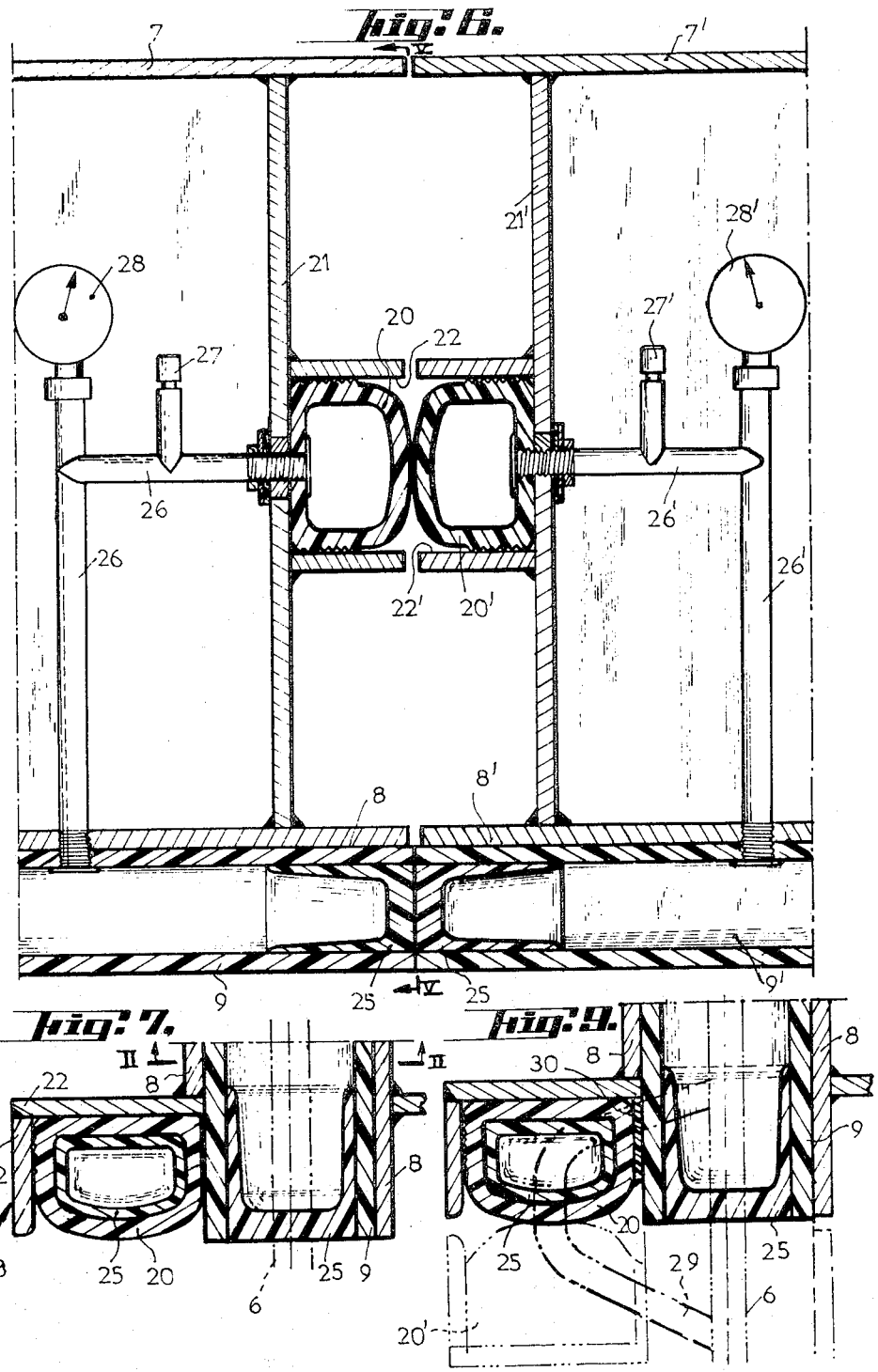

SEALING DEVICE, IN PARTICULAR FOR A HATCH-COVER OR THE LIKE

The present invention relates generally to and has essentially for its object a sealing device to be used between two separable bodies or structures adapted to be assembled in pressed-contact relationship to one another along at least one open or closed jointing line, and at least one of which is removable or movable with respect to the other, as well as a closing device for an access orifice such as, in particular, a ship hatch or like opening in a vehicle, for instance a rolling vehicle, or in a building, or, still more generally, for a passageway in any stationary or movable structure, of the type comprising at least one removable panel or cover and provided with a sealing device, more particularly a peripheral sealing device, of the aforementioned kind. The invention also relates to the various applications and uses resulting from the putting into practice of such a sealing device and/or closing device, as well as the systems, assemblies, structures, equipments and plants provided with such sealing devices and/or closing devices.

It is known that, especially in the case of ship hatch closing covers, the use of sponge rubber or like elastomer material as a sealing gasket for closing a hatch, is relatively limited owing to the permanent deformation of the gasket in use, a deformation which occurs rather rapidly, and owing to the limited permissible penetration into the said material, especially by the bearing and compression bar constituted in most cases by a vertically projecting, continuous flat rib serving as a sealing seat for the cover in sealingly closed position. Furthermore, new technical problems have arisen in the case of special ships such as cargo ships for the transportation of ponderous goods in bulk or non-stowed cargoes (tank vessels, oil- or ore-carrying vessels, etc.), and container-carrying ships. In the case of a ship for the transportation of ponderous goods in bulk, such as, for instance, an oil-carrying ship, the sealing problems are of greater importance than in other types of ships, owing to the internal gas pressure, the wave effects and the effects of the oil motion in the ship hold, for it is not possible to provide for a system of drainage, discharge or escape from the interior towards the exterior, so that the sealing problem is essential. In the case of container-carrying ships, the hatch-covers of which are retained, pressed and locked in place on their sealing gaskets by means of fixing and retaining devices consisting more particularly of "edge-clamps" connecting the sides of each cover to the corresponding coaming ledge, there is a growing demand, on the part of shipowners, that only four such locking devices be provided for each cover (two on each longitudinal side of the latter), despite the often considerable and growing dimensions and, especially, length of such covers. As a result, a uniform fluid-tightness over the whole length of the joint and, therefore, a sealing device of higher quality and permitting a greater penetration must be ensured.

Furthermore, on vessels of the so-called OBO type as well as container-carrying vessels, the dimensions of the hatches are proportionately much more considerable. This, owing to the motions of the vessels on the sea, results in much more considerable deformations of the ship's structure, thus leading to considerably increased difficulties in solving sealing problems and to the necessity of using a flexible sealing device capable of permitting a deeper penetration.

There is also known a sealing device used between two separable bodies or structures adapted to be assembled in pressed-contact relationship to one another along at least one open or closed joint line and at least one of which is removable or movable with respect to the other. Such a sealing device comprises generally a continuous flexible pipe or like resiliently or elastically deformable tubular envelope which is either closed at both ends or closed on itself, and secured along the said joint line on one of said two bodies so as to co-operate over its whole length with a narrower elongated bearing element formed of a compression bar or projecting flat rib, or with a similar and symmetrical pipe solid with the other body. Each pipe is generally inflatable with compressed air, for instance after placing one of the said two bodies against the other in sealed contact position. This type of inflatable or pneumatic sealing device is sometimes used for hatch-covers on board ships, more particularly as a peripheral sealing device (the inflatable pipe being secured along the lower edge of the cover inwardly of the latter and co-operating with a vertically projecting, flat sealing rib solid with the coaming ledge) and as an intermediate transverse sealing device between two closing covers of one and the same hatch, abutting against one another by their adjacent ends in closed position along a transverse joint line through the medium of a transverse sealing device of the inflatable type.

However, this type of inflatable or pneumatic sealing device does not satisfactorily solve the aforementioned technical problems, for it requires a permanent compressed-gas supply plant provided with pipings, valves, flexible pipes, ejectors, etc. . . , which are generally costly and require expensive maintenance. A main purpose of the present invention is therefore to solve the said technical problem in a reliable, efficient, simple and, therefore, economical manner, by creating a new, improved sealing device usable between two separable bodies such as a hatch-cover and a hatch edge, or such as two adjacent hatch closing panels, or, still more generally, between any cover and the associated edge of an orifice intended to be closed by the said cover or by two directly contiguous covers for one and the same orifice or the edge of the latter (such a sealing device being usable for a great variety of purposes).

To this end, the sealing device according to the invention is characterized in that the said pipe permanently contains an invariable amount or substantially constant mass of gaseous fluid.

According to another feature of the invention, the initial pressure of the gaseous fluid, for instance air, is substantially equal to the ambient atmospheric pressure, at least under normal temperature conditions, in the free or non-deformed state of the said pipe.

The invention is also directed at a closing device for an access or passageway orifice such as, for instance, a ship hatch of the type comprising at least one removable cover or panel and including a said sealing device, in particular a peripheral sealing device, extending over at least the whole effective or active portion of the joint line. Such a closing device is characterized in that the said pipe is mounted either on the hatch cover or on the hatch edge, whereas the said bearing element formed of a vertically projecting flat compression bar or rib, is mounted either on the hatch edge or on the said cover.

The considerable advantages offered by the solution according to the invention are quite obvious. Indeed, assuming, for instance, that the said pipe contains an invariable amount or mass of air, substantially under ambient atmospheric pressure, there is no air overpressure or relative pressure in the pipe when the latter has its free neutral or non-deformed configuration, i.e., when the closing cover is moved off the hatch (the pipe being in the idle state without coaming). When the covering is placed on the hatch coaming, it is pressed on the latter under the action of its own weight or any other force exerted on the cover, the flat sealing rib on the coaming (the transverse bearing width or thickness of which is less than the apparent outline of the pipe in orthogonal projection on the surface of the joint) penetrates into the pipe by deforming its wall, i.e., by pushing or forcing it in, thus resulting in a reduction of the internal volume of the pipe and, therefore, an increase in the internal pressure of the latter, and producing an overpressure or positive relative pressure. This leads to a pressure reaction between the flexible pipe and the flat sealing rib, thus enabling a substantially uniform contact-pressure to be obtained between the flat sealing rib and the flexible pipe, the latter thus being perfectly and uniformly applied on the seat formed by the flat sealing rib, however non-uniform the mutually contacting surfaces may be. In fact, the value of the said pressure reaction corresponds to the effort which is necessary to move the cover down. In certain cases, when large covers are used, the weight of the latter is sufficient to counterbalance the said reaction of the seal. As soon as the cover is moved off the hatch, for instance into the open position, the pipe recovers its initial shape in the idle state, in which it has a convex cross-sectional shape.

The shape of the sealing device according to the invention and its operating principle or its action are designed, in particular, to permit of a certain relative motion of the closing cover with respect to the coaming and in a parallel direction to the joint or orifice plane, without impairing fluid-tightness. Indeed, such a relative motion may be caused by the possible horizontal deformation of the longitudinal hatch coaming with the various conditions of ship loading. It is known from experience that, for an alternate horizontal displacement of the cover relative to the hatch coaming, there occurs absolutely no slip between the wall of the sealing pipe and the flat compression rib on both the mutually opposed sides of the cover which are perpendicular to the direction of the motion, which slip would lead to rapid wear of a seal of any other type, this absence of slip is due to the fact that, during a relative horizontal motion between the cover and the hatch coaming, that portion of the pipe wall which forms a seal and encompasses the flat compression rib remains in invariably adhering relationship to the latter, so that the exposed lower wall of the pipe adapts itself to this motion by becoming deformed in the lower wall portions located respectively on either side of the wall bead encompassing the sealing rib, i.e., between the said bead and each lateral (substantially vertical) wall of the said pipe.

To summarize, the sealing system according to the invention offers the following peculiarities as compared with the sealing systems used heretofore :

1. it ensures a uniform contact pressure as a result of the gas overpressure created, in particular, by the own weight of the closing cover, without requiring any external source of energy ;

2. owing to the special shape of the seal, it permits of relative horizontal and vertical displacements, within certain limits, of the cover with respect to the hatch coaming, as well as a certain deformation of the said coaming owing to the deformations of the ship or vessel as a result of longitudinal bending or torsion due to sea swell ;

3. it maintains a sealing contact due to the internal overpressure distributed over the whole length of the sealing device in spite of any casual local deflection of the support ;

4. it enables the number of cover locking devices or "edge-clamps" to be substantially reduced.

The invention will be better understood and other purposes, features, details and advantages of the latter will appear more clearly as the following explanatory description proceeds with reference to the appended diagrammatic drawings given solely by way of example illustrating various forms of embodiment of the invention and wherein :

FIG. 5 is a fragmentary end-view of the hatch-cover upon the sectional line V—V of FIG. 6, showing a transverse end-seal according to a first form of embodiment, adapted to co-operate with the homologous seal of an adjacent cover ;

FIG. 6 is a fragmentary sectional view upon the broken line VI—VI of FIG. 5, showing the intermediate transverse sealed connection between the adjacent ends of two adjacent covers in closed position on the same hatch ;

FIG. 7 is a partial sectional view upon the line VII—VII of FIG. 5, showing the mutual arrangement of the transverse seal and the peripheral seal ;

FIG. 8 is a view similar to that of FIG. 5, illustrating a modified foorm of embodiment ; and FIG. 9 is a partial sectional view upon the line IX—IX of FIG. 8.

Figure 1:
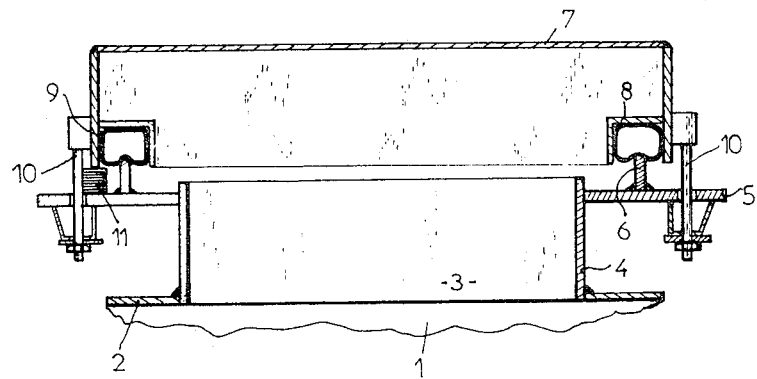
FIG. 1 is a cross-sectional view of a ship hatch provided with a closing cover equipped with a sealing system according to the invention.

According to the form of embodiment illustrated in FIG. 1, a ship hold 1 closed by an upper or exposed deck 2 comprises a hatch 3 passing through the said deck and defined above the latter by a frame 4 constituted by respectively longitudinal and transverse coamings and surrounded at its upper portion by a substantially horizontal coaming ledge 5 on which is secured a continuous flat bar or rib 6 projecting vertically upwardly, forming a sealing seat and extending in parallel relationship to the edge of the hatch all around the latter. The hatch is adapted to be closed by at least one cover 7 or by several successively adjacent covers abutting against one another by their adjacent ends 7, 7' etc ..., and extending over the whole hatch which is generally rectangular in shape. Each cover 7, 7', etc. . . is in the shape of a parallelepiped-shaped hollow case which is open on its lower face and whose lower edge is provided preferably internally, along at least the whole portion of its periphery adapted to co-operate with the sealing rib 6, with a downwardly open, hollow housing or recess in the form of a channel having, for instance, a uniform, inversed U-shaped cross-sectional profile, in which is mounted a flexible pipe 9 forming a sealing gasket and filled for instance with air, substantially under ambient atmospheric pressure. In case the hatch 3 is closed by a single cover 7, the pipe 9 is entirely closed on itself and extends along the entire periphery of the cover 7, whereas if the hatch is closed by at least two covers, the pipe 9 on each cover is composed of one or two sections with closed opposite ends, i.e., a single pipe section or segment on each end-cover, extending continuously along three successive sides of the cover as to co-operate respectively with the two longitudinal coamings and the adjacent transverse coaming, whereas in the case of an intermediate cover, the pipe 9 is composed of two rectilinear longitudinal sections extending along the longitudinal sides of the cover to co-operate respectively with the two opposite longitudinal coamings.

In the sealingly closed position shown in FIG. 1, each cover such as 7 is retained in place and locked or fixed on the hatch by a certain number of spaced fastening devices 10 forming "edge-clamps" known per se and each of which is generally constituted by a substantially vertical rod, preferably removably connected by its upper end to the corresponding side of the cover and passing through the coaming ledge 5 by being connected to the latter from below. The said "edge-clamps" serve only to fix the cover to the hatch and are not intended to ensure or contribute to fluid-tightness, the latter being obtained solely as a result of the sealing device according to the invention without the assistance of the "edge-clamps." Maximum inward deformation of the pipe 9 by the sealing rib 6 may be limited by a stop 11 placed on the top of the coaming ledge, in such a position that at a predetermined limit of inward deformation of the pipe 9 the external lower peripheral edge of the cover 7 firmly bears upon the stop 11, the height or vertical dimension of the said stop determining the maximum value of the permissible inward deformation of the pipe 9.

Figure 4:
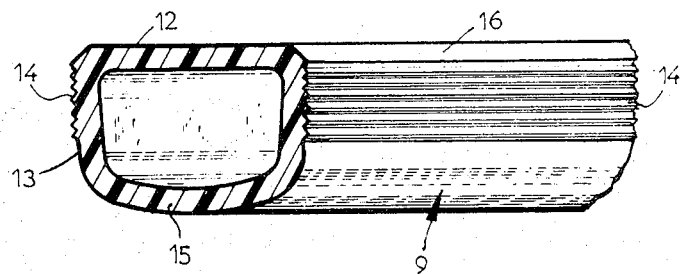
FIG. 4 is an isolated detailed fragmentary, partially cross-sectional view of a portion of the resilient pipe forming a sealing gasket.

FIG. 4 shows, to a larger scale, the shape of the pipe 9 which advantageously has an at least approximately rectangular or trapezoidal cross-sectional profile, the height or vertical dimension of which corresponds substantially to the depth of the housing 8 containing the pipe. The pipe 9 has a preferably substantially plane upper external face 12 (corresponding to the upper horizontal rectilinear side of its cross-sectional profile) in order to be applied against the bottom of the housing 8, and two substantially vertical lateral external faces 13 which are longitudinally slotted, splined or grooved at least over a portion 14 of their height, adjacent to the plane face 12, each slotted portion 12 projecting outwardly with respect to the adjacent portions, in particular the lower portions, of the said lateral faces which are connected therewith by a corresponding offset. The said grooved portions are intended to be applied respectively against the corresponding vertical internal lateral walls of the housing 8. The dimensions of pipe 9 are so selected that, when its configuration is not deformed, as shown in FIG. 5, it completely fills the housing 8 and has a convex and preferably uniform cross-section, the smooth or non-grooved lower portions 13 of its lateral faces being separated from the adjacent lateral walls of the housing 8, as appears more particularly in FIG. 2. The exposed lower face 15 of the pipe in the free or non-deformed state has either a convex bulged shape (corresponding to a curved or arcuate side of its cross-sectional profile) or a straight or plane shape. The upper angles or corners 16 of the pipe are advantageously bevelled.

In the closed position of the cover 7, wherein the latter completely bears, through the medium of its resilient pipe 9, upon the sealing rib 6, the latter penetrates or moves into the pipe 9 by its upper edge, by forcing into the pipe 18 of its exposed lower wall 15, which portion then forms a sort of bead or boss projecting into the pipe and partially encompassing the upper edge of the rib 6. In FIG. 1 and in FIG. 2 (to a larger scale) the configuration of the pipe 9 in the deformed state corresponds to the medial position of the cover 7 in the horizontal plane, wherein the corss-sectional configuration of the pipe 9 is substantially symmetrical with respect to the axis or medial longitudinal vertical plane of the pipe, which plane then coincides with the medial longitudinal vertical plane 18 of the sealing rib 6. It should be noted that also in FIG. 4 the configuration of the pipe 9 in the free state is substantially symmetrical with respect to its medial longitudinal vertical plane.

Figure 2:
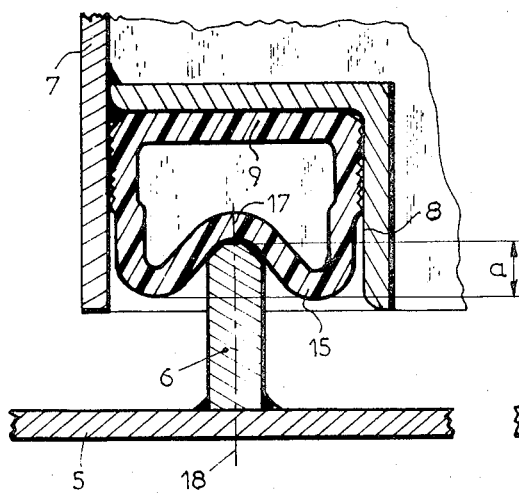
FIG. 2 is a fragmentary cross-sectional view, to a larger scale, upon the line II—II of FIG. 7, of the peripheral sealing device of the cover in the medial or neutral closed position of the latter.
Figure 3:
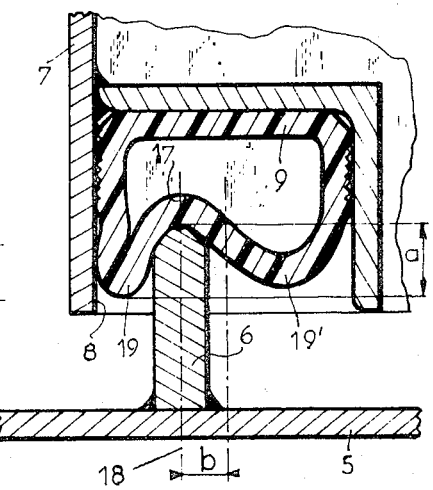
FIG. 3 is a view similar to FIG. 2, showing the configuration of the said sealing device subsequent to a horizontal relative displacement, in a transverse direction to the seal, of the hatch-cover or the hatch coaming.

The depth of penetration of the sealing rib 6 into the pipe 9 is measured by the dimension $a$ in FIGS. 2 and 3 and depends upon the overpressure within the pipe 9, the latter being a function of the weight of the cover or the downward force exerted on the latter. The depth of penetration $a$ may vary, for instance, from 15 to 25 mm or more, depending upon the dimensions and shape of the seal.

The resulting pressure within the seal augments as the penetration increases, according to a definite function, the parameters of which depend upon the dimension and shape of the seal.

The permissible relative horizontal displacement $b$ transversely of the sealing ribs 6, between the latter and the cover 7, on either side of the vertical longitudinal medial plane 18, may reach for instance 15 mm or more, depending upon the dimensions and shape of the seal and without creating any significant additional over-pressure in the seal, the system thus being enabled to readily adapt itself to such displacements, as shown in particular in FIG. 3. In this Figure it is observed that the bead 17 of the pipe 9 has moved nearer to one of the vertical lateral walls of the pipe, as a result of the deformation, respectively in mutually opposite directions, of the portions 19 and 19' of wall 15 of the pipe, located respectively between the sealing rib 6 and the lateral walls of the pipe 9.

FIGS. 5, 6 and 7 illustrate the case of two contiguous covers 7, 7' abutting against one another by their adjacent ends in closed position along a transverse joint line through the medium of a transverse seal. For the sake of simplification, the coaming ledge 5 and the sealing rib 6 are assumed to be omitted in FIG. 5 and shown only in dash-dotted lines, whereas in FIG. 6 the coaming ledge and the sealing rib are completely omitted. The transverse sealing device is constituted, for each cover, by a pipe 20 of the same type as pipe 9, constituting a peripheral sealing gasket secured externally on the transverse, for instance substantially vertical, end wall 21 of the cover in a channel-shaped housing 22. Each pipe 20 extends continuously along the wall 21 by passing above the peripheral sealing pipe 9 on either side of the cover and preferably extends laterally beyond each side of the cover at 23 and abuts laterally at 24 against the adjacent peripheral seal, externally of the latter, so that the two pipes are directly interconnected through the medium of abutment as seen in FIG. 5 of their mutually adjacent faces intercrossed through gaps or interrupted portions 8a and 22a of the adjacent lateral walls of the respective housings 22, 8. As seen in FIG. 5, each end of the transverse sealing pipe 20 projects longitudinally beyond its housing 22, 23 by extending lower than the adjacent peripheral sealing pipe 9 so as to bear directly upon the upper face of the hatch edge or of the coaming ledge 5. Each end of peripheral sealing pipe 9 and transverse sealing pipe 20 of each cover is closed by a hollow plug 25 which is, for instance, substantially socket-shaped and advantageously inserted into the said end of the pipe.

It is observed in FIG. 6 that in the closed position of the two adjacent covers 7, 7' the two respective transverse sealing pipes 20, 20' of the two covers are mutually in contact by their opposed face and thus ensure the fluid-tightness of this intermediate transverse joint, the respective peripheral sealing pipes 9, 9' of the two covers also being in abutting relationship to one another by their adjacent ends provided with the plugs 25.

On one and the same cover 7, 7' the internal space of the transverse sealing pipe 20, 20' is connected with the internal space of the peripheral sealing pipe 9, 9' by at least one permanent intercommunication conduit 26, 26' serving to equilibrate the internal pressure on both seals, so that the internal overpressure of the transverse seal 20, 20' is established by the internal overpressure of the peripheral seal 9, 9' to ensure fluid-tightness. Each permanent intercommunication conduit 26, 26' is advantageously provided with a supply or discharge valve 27, 27' for the supply or discharge of the gaseous fluid, and it may also be provided with a pressure gauge 28, 28'.

FIGS. 8 and 9 show a modified form of embodiment of the transverse seal, wherein, in contradistinction to the arrangement shown in FIG. 5, each end of the transverse sealing pipe 20 is located substantially at the same level as the effective or active lower face 15 of the peripheral sealing pipe 9 and bears, in the closed position of the cover 7, upon an auxiliary support 29 solid with the edge of the hatch, for instance of the coaming ledge 5 and/or the sealing rib 6 which is shown in dash-dotted lines in FIG. 8 and FIG. 9. The said support may be provided in an isolated form only at the location of each intermediate transverse seal between two successive adjacent covers and is preferably common to both adjacent covers as shown, for instance, in FIG. 9, wherein the seal 20' of the adjacent cover is shown in dot-dashed lines.

As shown in particular in FIGS. 8 and 9, the said two, respectively peripheral and transverse sealing pipes 9 and 20 may be secured to one another by means of an interposed connecting member 30, the cross-sectional configuration of which is substantially in the shape of an inverted T. The said interposed member may of course be provided also in the form of embodiment illustrated in FIGS. 5 and 7. For the intercrossed arrangement of pipes 9 and 20 it is necessary to suitably prepare their mutually confronting faces which are intended to be placed in mutual contact. To this end, it is advantageous to cancel the grooves 14 on the contact face of at least one of the two pipes (for instance pipe 20) and, preferably, of both pipes, for instance by means of a grinding operation, and then the intermediate member 30, which is advantageously made of rubber, for instance artificial rubber, or of a light elastomer material, for instance a synthetic material, is tightly secured to one of the pipes, for instance pipe 9, by way of vulcanization. The other pipe (i.e., pipe 20) is thereafter secured by way of sticking to the interposed member 30. In the form of embodiment of FIGS. 5 and 7, the pipes are assembled directly, for instance by way of sticking or vulcanization, without any interposed member, and it is observed that there is a region of compression of the combined or composite seal thus obtained at 31 in FIG. 5.

Of course, the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. A device for closing an access orifice such as a ship's hatch comprising at least two removable covers, a peripheral sealing device for each cover provided on and between two structures consisting of said covers and of a body about the edge of said orifice respectively and extending over at least the whole operative portion of a corresponding joint line, each said sealing device comprising a peripheral continuous sealing flexible pipe having side walls and secured in a recess to one of said structures, each pipe being sealed and containing therein an invariable amount of gaseous fluid, a cooperating bearing element mounted on said body for each pipe which upon the closing position of said covers engages and deforms the surface of the pipe it engages to change the inner volume of the pipe and elevate the pressure of said gaseous fluid within the pipe and thereby automatically effect and maintain a pressure seal between engaged surface positions of the element and the surface of said pipe while said closing position of said cover is maintained, said covers having ends which in said closed position are closely adjacent each other along a transverse joint line, a transverse seal device on each cover located thereon to abut each other in said closed position of said covers, each said transverse sealing device comprising a sealed transverse flexible pipe secured externally to a transverse end-wall of each cover adjacent said transverse joint line and extending along said end-wall and passing over and along an adjoining one of said peripheral sealing pipes to project beyond either side of said cover and extend down towards the lower edge of said cover and laterally engage said one peripheral sealing pipe, externally of the latter, each transverse pipe being housed in respective recesses having side walls and a gap in one side wall communicating with a like gap in an adjacent side wall of an adjacent recess on the adjacent cover so that both said peripheral and transverse pipes are connected to each other at adjacent crossing and abutting faces extending outwardly of said gaps.

2. A device according to claim 1 wherein both said peripheral and said transverse sealing pipes communicate with one another via a connecting duct member.

3. A device according to claim 1, wherein each end of at least one of said sealing pipes of each cover is closed by a substantially socket-shaped hollow plug inserted into said pipe end.

4. A device according to claim 1, wherein each end of said transverse sealing pipe extends longitudinally beyond its recess by extending downwards lower than the adjacent peripheral sealing pipe, so as to bear directly upon the body adjacent the edge of the orifice underlying said covers.

5. A device according to claim 1, wherein each end of said transverse sealing pipe is located substantially at the same level as the operative sealing face of said peripheral sealing pipe and bears upon an auxiliary support fast with the edge of the said orifice and common to both adjacent covers.

6. A device according to claim 1, comprising at least one permanent intercommunication duct connecting a said peripheral sealing pipe with a transverse sealing pipe and provided with a valve.

7. A device as per claim 1, including stop means for restricting the extent of deformation of said peripheral flexible sealing pipes by said bearing elements.

8. A device as per claim 1, wherein side walls of said pipe are spaced apart to permit relative horizontal displacement between said bearing element and said cover.

9. A device according to claim 1, wherein opposite side walls of said peripheral continuous sealing flexible pipe have grooved portions bearing against walls of the recess in which it is secured.

* * * * *